(12) United States Patent
Asaoku

(10) Patent No.: US 11,845,033 B2
(45) Date of Patent: Dec. 19, 2023

(54) EXHAUST GAS PURIFICATION FILTER

(71) Applicant: DENSO CORPORATION, Kariya (JP)

(72) Inventor: Kana Asaoku, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/592,206

(22) Filed: Feb. 3, 2022

(65) Prior Publication Data

US 2022/0152543 A1 May 19, 2022

Related U.S. Application Data

(63) Continuation of application No. PCT/JP2020/029932, filed on Aug. 5, 2020.

(30) Foreign Application Priority Data

Aug. 20, 2019 (JP) .................. 2019-150586

(51) Int. Cl.
*B01D 46/24* (2006.01)
*F01N 3/022* (2006.01)
*B01D 39/20* (2006.01)

(52) U.S. Cl.
CPC ....... *B01D 46/249* (2021.08); *B01D 46/2429* (2013.01); *B01D 46/24491* (2021.08); *F01N 3/0222* (2013.01); *B01D 39/2068* (2013.01); *F01N 2330/06* (2013.01); *F01N 2330/30* (2013.01)

(58) Field of Classification Search
CPC ............ B01D 46/249; B01D 46/24491; B01D 46/2429; B01D 39/2068; F01N 3/0222; F01N 2330/06; F01N 2330/30

USPC .......................................... 55/523
See application file for complete search history.

(56) References Cited

U.S. PATENT DOCUMENTS

| | | |
|---|---|---|
| 2004/0177600 A1 | 9/2004 | Ichikawa et al. |
| 2007/0269634 A1 | 11/2007 | Suenobu et al. |
| 2010/0215898 A1 | 8/2010 | Suenobu et al. |
| 2018/0104635 A1 | 4/2018 | Miyairi et al. |
| 2018/0104636 A1 | 4/2018 | Miyairi et al. |
| 2018/0215672 A1* | 8/2018 | Kitaguchi ............. C04B 41/009 |

(Continued)

FOREIGN PATENT DOCUMENTS

| | | |
|---|---|---|
| JP | 2003-214140 | 7/2003 |
| JP | 2015-090235 | 5/2015 |
| WO | 2013/024745 | 2/2013 |

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a cell assembly including cells each having a quadrangular cross-sectional shape and a partition wall, seal members, and a skin member. The partition wall has a porosity P1 of 50% to 70%, and the skin member has a porosity P2 of 50% to 70%, the porosity P1 and the porosity P2 satisfy a relationship P1<P2. A difference between the porosity P2 and the porosity P1 is 20% or less. The partition wall includes crossing portions, each cell has at least one part of an outer periphery defined by a corresponding one of the crossing portions, the at least one part is rounded to have a radius of curvature R, each cell has a radius r of a hydraulic diameter, the radius of curvature R and the radius r of the hydraulic diameter satisfy a relationship 0.2<R [mm]/r [mm]<1.

6 Claims, 12 Drawing Sheets

(56) References Cited

U.S. PATENT DOCUMENTS

2018/0326341 A1* 11/2018 Kato ................. B01D 46/2484
2019/0193067 A1   6/2019 Yamada et al.
2019/0224606 A1   7/2019 Imagawa et al.

* cited by examiner

EXHAUST GAS PURIFICATION FILTER

CROSS-REFERENCE TO RELATED APPLICATION

The present application is a continuation application of International Application No. PCT/JP2020/029932, filed on Aug. 5, 2020, which claims priority to Japanese Patent Application No. 2019-150586, filed on Aug. 20, 2019. The contents of these applications are incorporated herein by reference in their entirety.

BACKGROUND

Technical Field

The present disclosure relates to an exhaust gas purification filter.

Background Art

Exhaust gas discharged from an internal combustion engine such as a gasoline engine or a diesel engine contains particulate matter referred to as particulates (hereinafter referred to as "PM" as appropriate). To collect PM in the exhaust gas to purify the exhaust gas, an exhaust gas purification filter is disposed in an exhaust passage in the internal combustion engine.

SUMMARY

In the present disclosure, provided is an exhaust gas purification filter as the following.

The exhaust gas purification filter includes: a cell assembly including: a plurality of cells each disposed to extend in an axial direction of the filter, each of the cells having a quadrangular cross-sectional shape in a plane orthogonal to the axial direction, and a partition wall; a plurality of seal members; and a skin member, the partition wall has a porosity P1 of 50% to 70%, and the skin member has a porosity P2 of 50% to 70%, the porosity P1 of the partition wall and the porosity P2 of the skin member satisfy a relationship P1<P2, a porosity difference ΔP between the porosity P2 and the porosity P1 is 20% or less, and the partition wall includes a plurality of crossing portions, each of the cells has at least one part of an outer periphery defined by a corresponding one of the crossing portions, the at least one part of the outer periphery is rounded to have a radius of curvature R, each of the cells has a radius r of a hydraulic diameter, the radius of curvature R and the radius r of the hydraulic diameter satisfy a relationship 0.2<R [mm]/r [mm] <1.

BRIEF DESCRIPTION OF THE DRAWINGS

The above-described objects and other objects, features, and advantages will be clearer from the detailed description taken with reference to the accompanying drawings.

DETAILED DESCRIPTION OF THE PREFERRED EMBODIMENTS

Figure 1:
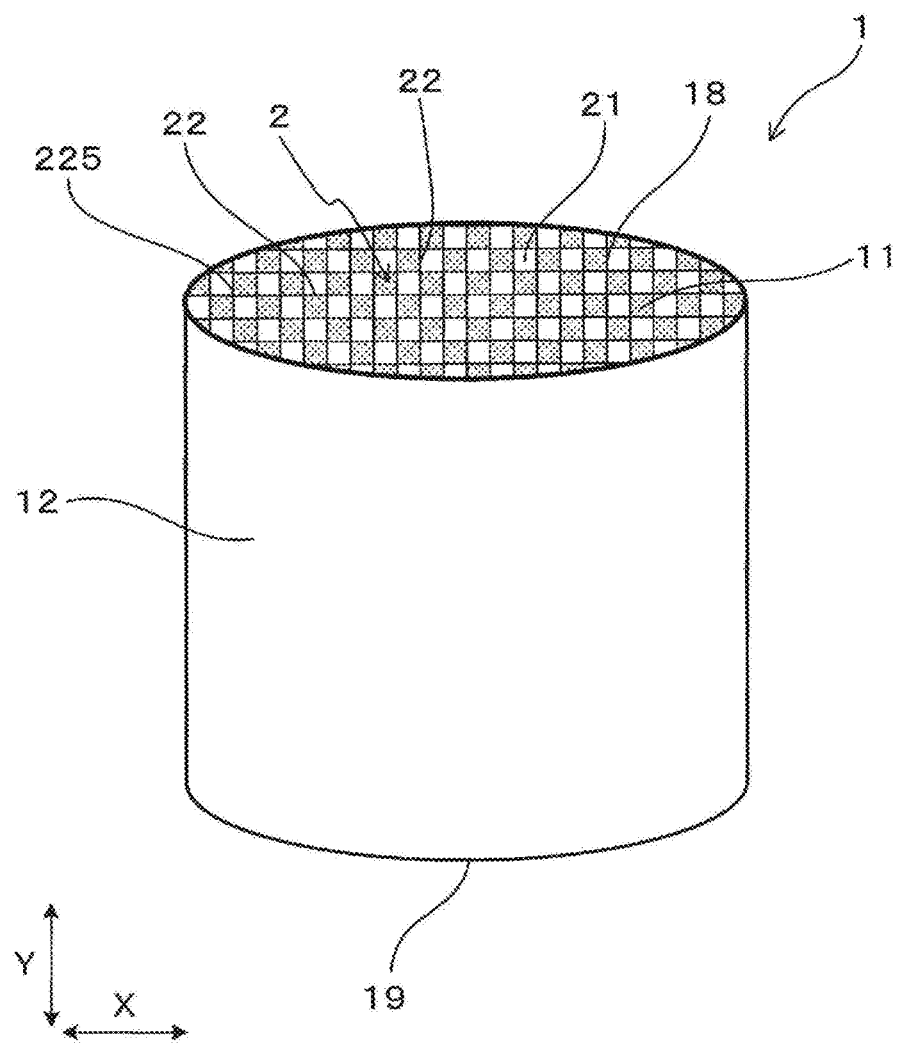
FIG. 1 is a schematic diagram of an exhaust gas purification filter in a first embodiment.

An exhaust gas purification filter of this type, for example, PTL 1 discloses an exhaust gas purification filter that collects PM discharged from the diesel engine (this exhaust gas purification filter is hereinafter referred to as a "DPF"). Specifically, the PTL 1 describes a DPF that satisfies the relationship Pi<Po or the relationship Pi>Po and Di<Do where Pi and Di respectively denote the porosity and pore size of a partition wall in a central portion of a vertical cross section with respect to the axial direction, and Po and Do respectively denote the porosity and pore size of a partition wall in an outer circumferential portion of the vertical cross section with respect to the axial direction. According to the PTL 1, such a technique allows cracking to be suppressed during PM regeneration.

[PTL 1] JP 2004-270569 A

An exhaust gas purification filter that collects PM discharged from the gasoline engine (this exhaust gas purification filter is hereinafter referred to as a "GPF" as appropriate) is exposed to a high temperature environment as compared with a DPF, therefore a flow velocity of exhaust gas is high and the pressure loss tends to increase. Additionally, in the GPF, a central portion of the filter, in which exhaust gas is likely to flow, is likely to have high temperature, and thus thermal stress is caused by a temperature difference between the filter central portion and the filter outer circumferential portion cooled by the exhaust passage such as an exhaust pipe, leading to the likelihood of cracking in the filter outer circumferential portion. A technique for increasing filter strength may be to thicken partition wall to increase a filter heat capacity. An increased filter heat capacity reduces the temperature difference in the filter. However, indiscriminate thickening of the partition wall restricts the flow of the exhaust gas, increasing the pressure loss. In contrast, in a case where the porosity of the partition wall is increased with a certain lower limit for the porosity maintained in order to suppress a possible increase in pressure loss, a filter weight is reduced to decrease the filter heat capacity.

An object of the present disclosure is to provide an exhaust gas purification filter that can improve thermal shock resistance while maintaining a reduced pressure loss.

An aspect of the present disclosure is an exhaust gas purification filter configured to be disposed in an exhaust passage of a gasoline engine, the exhaust gas purification filter includes: a cell assembly having an outer surface and including: a plurality of cells each disposed to extend in an axial direction of the filter, each of the cells having a quadrangular cross-sectional shape in a plane orthogonal to the axial direction, and each of the cells having opposing first and second ends in the axial direction, and a partition wall configured to have a porous structure and define the plurality of cells partitioned from each other, a plurality of seal members disposed alternately in the first and second ends of the respective cells, each of the seal members being configured to seal a corresponding one of the first end and the second end of a corresponding one of the cells of the cell assembly; and a skin member configured to have a tubular shape and be mounted on the outer surface of the cell assembly, wherein the partition wall has a porosity P1 of 50% to 70%, and the skin member has a porosity P2 of 50% to 70%, the porosity P1 of the partition wall and the porosity P2 of the skin member satisfy a relationship P1<P2, a porosity difference ΔP between the porosity P2 of the skin member and the porosity P1 of the partition wall is 20% or less, and the partition wall includes a plurality of crossing portions, each of the cells has at least one part of an outer periphery defined by a corresponding one of the crossing portions, the at least one part of the outer periphery of each of the cells is rounded to have a radius of curvature R, each of the cells has a radius r of a hydraulic diameter, the radius of curvature R and the radius r of the hydraulic diameter satisfy a relationship 0.2<R [mm]/r [mm]<1.

The above-described exhaust gas purification filter has the above-described configuration. Thus, the above-described exhaust gas purification filter can improve thermal shock resistance while maintain a reduced pressure loss.

Parenthesized reference signs recited in claims indicate correspondence relations with specific means described in embodiments described below and are not intended to limit the technical scope of the present disclosure.

First Embodiment

Figure 2:
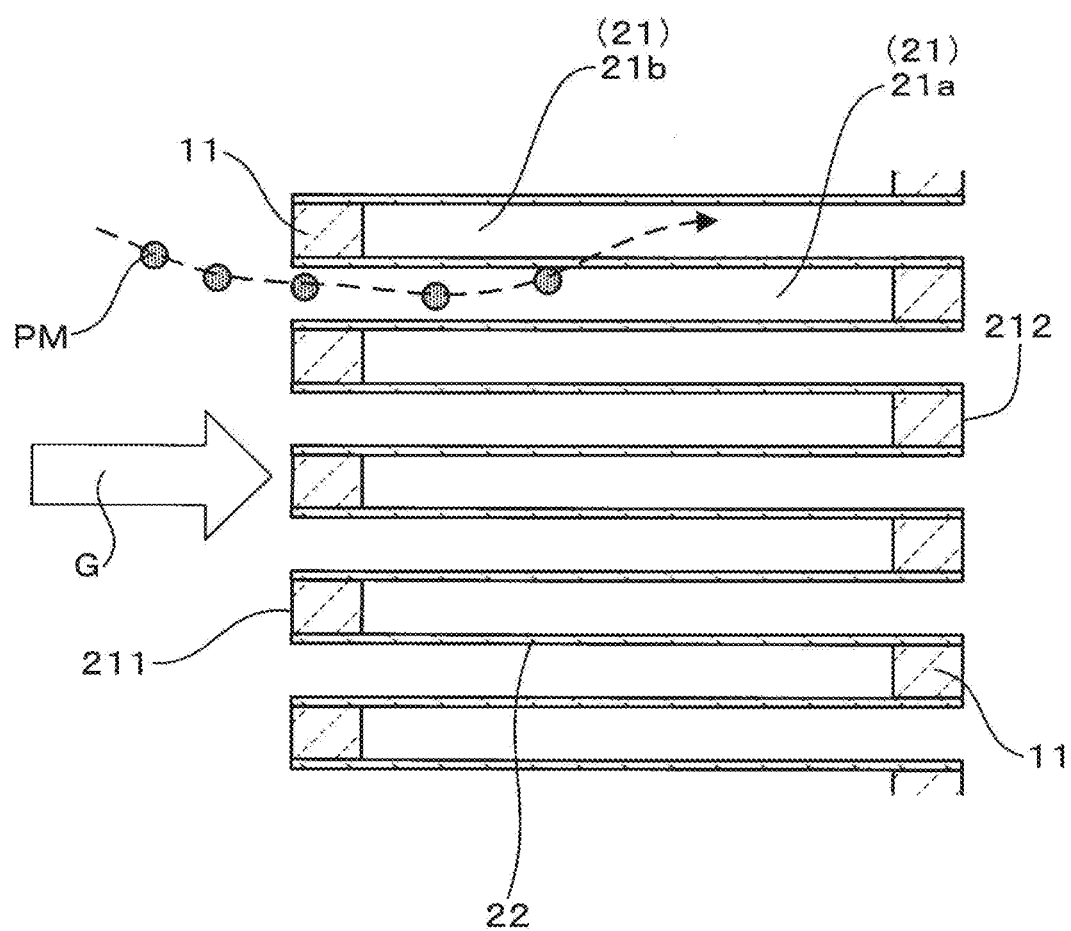
FIG. 2 is an enlarged cross-sectional view in a filter axial direction of the exhaust gas purification filter in the first embodiment.

An exhaust gas purification filter according to the first embodiment will be described with reference to FIGS. 1 to 6. As illustrated in FIGS. 1 and 2, an exhaust gas purification filter 1 of the present embodiment includes a cell assembly 2, a seal members 11, and a skin member 12. The cell assembly 2 and the skin member 12 are formed of ceramics such as cordierite.

The cell assembly 2 includes a plurality of cells 21 and partition wall 22 having a porous structure. Each of the cells 21 extend in a filter axial direction Y. The filter axial direction Y normally aligns with an extension direction of the cells 21. The partition wall 22 defines the cells 21 partitioned from each other and the cells 21 form in a grid pattern. The partition wall 22 is generally also referred to as cell wall.

Figure 3:
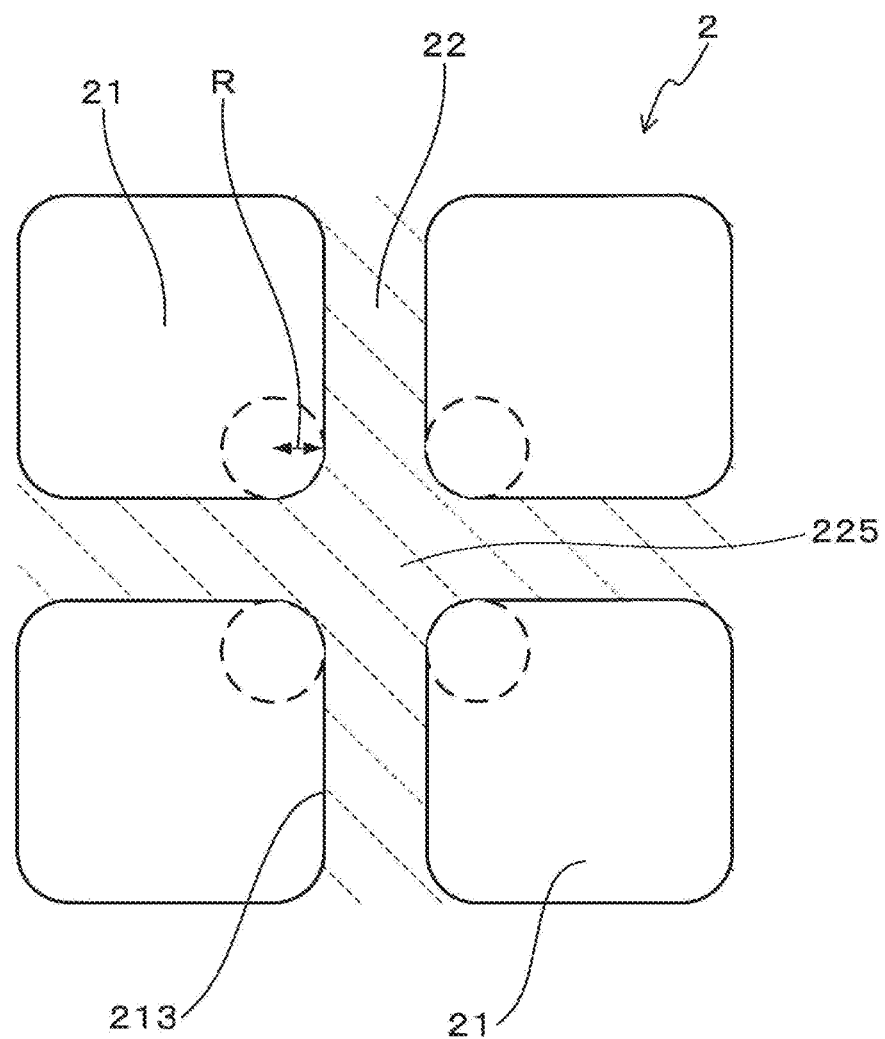
FIG. 3 is an enlarged cross-sectional view of a crossing portion of partition wall in a direction orthogonal to a filter axial direction of the exhaust gas purification filter in the first embodiment.
Figure 4:
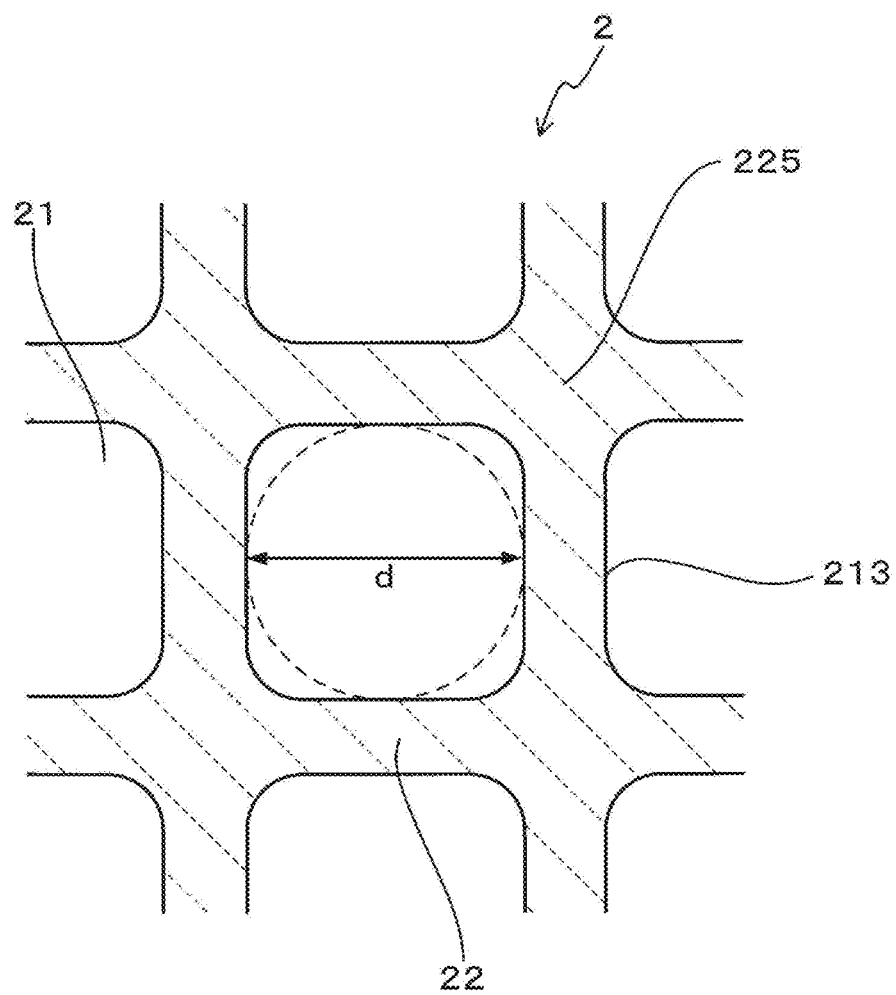
FIG. 4 is an enlarged cross-sectional view of a cell in the direction orthogonal to the filter axial direction of the exhaust gas purification filter in the first embodiment.

As illustrated in FIGS. 1, 3, and 4, each cell 21 has a quadrangular cross-sectional shape in a plane orthogonal to the filter axial direction Y. Note that in a case where four corners (four vertex portions) of a quadrangular cell shape are rounded, such a cell shape is assumed to be a quadrangle because the cell shape appears like a quadrangle in appearance.

The skin member 12 has, for example, a tubular shape like a cylindrical shape. The skin member 12 is formed integrally on an outer surface of the cell assembly 2. The axial direction of the skin member 12 normally aligns with the filter axial direction Y. The partition wall 22 partition the inside of the skin member 12 into a grid form to form a large number of cells 21. The exhaust gas purification filter 1 is a porous body, and the partition wall 22 and the skin member 12 are provided with a large number of pores.

The exhaust gas purification filter 1 can collect PM contained in exhaust gas by accumulating the PM on surfaces of the partition wall 22 and in the pores. The PM is microparticles referred to as particulate matter, particulates, and the like.

The exhaust gas purification filter 1 is, for example, a columnar body shaped like a cylinder, and has a size that can be changed as appropriate. In a case where the exhaust gas purification filter 1 is cylindrical, for example, a length L in the filter axial direction Y can be adjusted between 50 mm and 200 mm, and a diameter Φ can be adjusted between 100 mm and 165 mm. The exhaust gas purification filter 1 includes an inflow end surface 18 and an outflow end surface 19 respectively provided at ends in the filter axial direction Y. The inflow end surface 18 is an end surface on the side where an exhaust gas flows in, and the outflow end surface 19 is an end surface on the side where an exhaust gas flows out. In a case where the exhaust gas purification filter 1 is not disposed in a flow of exhaust gas such as in an exhaust pipe, the inflow end surface 18 and the outflow end surface 19 mean mutually relative surfaces. In other words, in a case where one of the end surfaces is the inflow end surface 18, the other is the outflow end surface 19. For example, the inflow end surface 18 can also be referred to as a first end surface in the filter axial direction Y, and the outflow end surface 19 can also be referred to as a second end surface in the filter axial direction Y.

The cell 21 can include first cells 21a and second cells 21b. As illustrated in FIG. 2, each of the first cells 21a is, for example, open in the inflow end surface 18 and is closed by a corresponding seal member 11 in the outflow end surface 19. Each of the second cells 21b is, for example, open in the outflow end surface 19 and is closed by a corresponding seal member 11 in the inflow end surface 18.

The seal members 11 are disposed alternately in the ends 211, 212 of the respective cells in the filter axial direction Y, each of the seal members being configured to seal a corresponding one of the ends 211, 212 of a corresponding one of the cells of the cell assembly. In other words, the seal members 11 close the ends 211 of the cells 21 at the inflow end face 18 and close the ends 212 of the cells 21 at the outflow end face 19. The seal members 11 can be formed of ceramics such as cordierite but may be formed of any other material. In FIG. 2, the seal members 11 shaped like plugs are formed. However, the shape of the seal members 11 is not particularly limited, as long as the seal members 11 can seal the ends of the cells 21. Note that although illustration of the configuration is omitted, the seal members 11 can also be formed by, for example, partly deforming the partition wall 22 in the inflow end surface 18 or the outflow end surface 19. In this case, parts of the partition wall 22 form the seal members 11, and thus the partition wall 22 and the seal members 11 are integrally and continuously formed.

The first cells 21a and the second cells 21b are formed to be alternately arranged adjacent to one another in a lateral direction X orthogonal to the filter axial direction Y and in a vertical direction Z orthogonal to both the filter axial direction Y and the lateral direction X, for example. In other words, when the inflow end surface 18 or the outflow end surface 19 of the exhaust gas purification filter 1 is viewed in the filter axial direction Y, the first cells 21a and the second cells 21b are arranged, for example, in a check pattern. The partition wall 22 separate the first cells 21a from the second cells 21b.

In this regard, in the exhaust gas purification filter 1, the porosity P1 of the partition wall 22 and the porosity P2 of the skin member 12 are both 50% or more and 70% or less. Additionally, the porosity P1 of the partition wall 22 and the porosity P2 of the skin member 12 satisfy the relationship P1<P2. In addition, a porosity difference ΔP defined by P2−P1 is 20% or less. The porosity P1 of the partition wall 22 and the porosity P2 of the skin member 12 are measured based on the principle of a mercury intrusion method. Note that the porosity P1 of the partition wall 22 has the same meaning as that of the porosity of the cell assembly 2.

Specifically, the porosity P1 of the partition wall 22 and the porosity P2 of the skin member 12 can be measured by a mercury porosimeter using the principle of the mercury intrusion method. As the mercury porosimeter, for example, AutoPore IV9500 manufactured by Shimadzu Corporation can be used. Measurement conditions are as follows.

First, measurement samples are collected from the cell assembly 2 and skin member 12 of the exhaust gas purification filter 1. However, no samples are collected from portions where the seal members 11 are present. A measurement sample of the cell assembly 2 is a general cube having a length of 1 cm in the filter axial direction Y, a length of 1 cm in the thickness direction of the partition wall 22, and a length of 1 cm in a direction orthogonal to the filter axial direction Y and the thickness direction of the partition wall 22 described above. A measurement sample of the skin member 12 is a general rectangular parallelepiped having a length of 1 cm in the length in the filter axial direction Y, a length equal to the thickness of the skin member 12, in a filter radial direction from an outer front surface of the skin member 12 toward a central portion of the filter, and a length of 1 cm in a circumferential direction of the skin member 12. Each of the measurement samples is housed in a measurement cell of the mercury porosimeter, and the measurement cell is internally depressurized. Subsequently, mercury is introduced into the measurement cell, which is then pressurized. The pore diameter is measured based on the pressure during the pressurization and the volume of mercury introduced into the pores in the measurement sample.

The pressure for the measurement ranges from 0.5 psia to 20000 psia. Note that 0.5 psia corresponds to $0.35 \times 10^{-3}$ kg/mm$^2$ and that 2000 psia corresponds to 14 kg/mm$^2$. The pore diameter corresponding to the pressure range ranges from 0.01 μm to 420 μm. As constants used to calculate the pore diameter from the pressure, a contact angle of 140° and a surface tension of 480 dyn/cm are used. The porosity P1 of the partition wall 22 and the porosity P2 of the skin member 12 are calculated in accordance with relation expressions below.

Porosity $P1$(%) of partition wall 22=total pore volume/(total pore volume+1/true specific gravity of partition wall material)×100

Porosity $P2$(%) of skin member 12=total pore volume/(total pore volume+1/true specific gravity of skin member material)×100

Note that in a case where materials for the partition wall and the skin member are cordierite, the true specific gravity of cordierite can be 2.52.

In the exhaust gas purification filter 1, the partition wall 22 includes a plurality of crossing portions 225, each of the cells 21 has at least one part of the outer periphery 213 defined by a corresponding one of the crossing portions, the at least one part of the outer periphery 213 of each of the cells is rounded. In other words, as illustrated in FIGS. 3 and 4, in a cross section in a plane orthogonal to the filter axial direction Y, the outer periphery 213 of the cell 21 has an arc shape like a circular arc at the crossing portions 225 of the partition wall 22. In the above-described cross section, the crossing portions 225 of the partition wall 22 may correspond to a corner of the cell 21. In other words, the outer periphery 213 of the cell 21 being rounded at the crossing portions 225 of the partition wall 22 being substantially the same as the corners of the cell 21 being shaped like an arc. Note that the crossing portions 225 are at the position where the partition wall 22 formed into a grid intersect. Additionally, a direction orthogonal to the filter axial direction Y is the filter radial direction in a case where the exhaust gas purification filter 1 is cylindrical.

As illustrated in FIG. 3, the radius of curvature R is assumed to be the radius of the circle of maximum size adjacent to the rounded part of the outer periphery 213 of the cell 21 at the crossing portions 225 of the partition wall 22. Additionally, as illustrated in FIG. 4, typically, even in a case where each cell 21 through which exhaust gas flows has a quadrangular opening cross section, the exhaust gas flows inside a circle with a diameter referred to as a hydraulic diameter d. The radius of the hydraulic diameter d of each cell 21 is assumed to be r (=d/2). The radius of curvature R at the crossing portions 225 of the partition wall 22 and the radius r of the hydraulic diameter d of the cell 21 are measured as follows.

Figure 5:
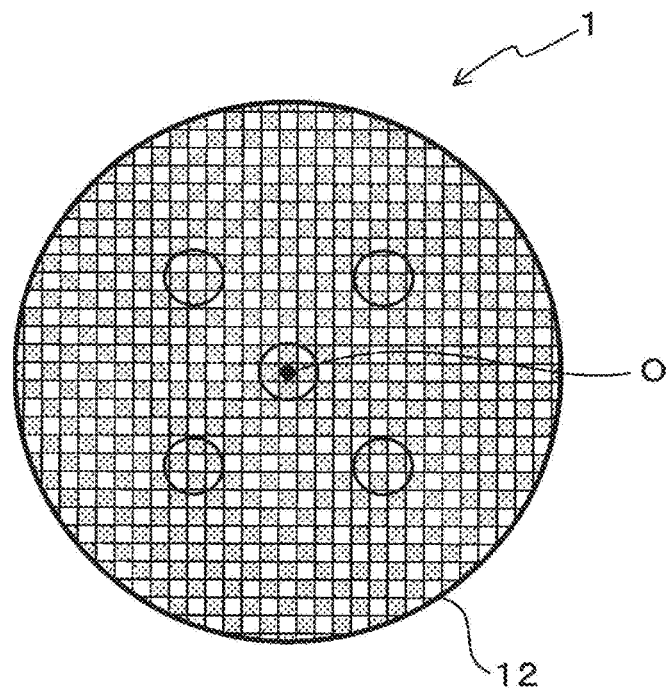
FIG. 5 is an explanatory diagram illustrating measurement positions for a radius of curvature R and a hydraulic diameter of the cell in the first embodiment.

As shown in FIG. 5, measurement positions for the radius of curvature R at the crossing portions 225 of the partition wall 22 include a central portion O in the direction orthogonal to the filter axial direction Y and four points each located at 45 degrees from the central portion O and at a distance half the distance between the central portion O and the skin member 12, from the central portion O. In other words, the measurement positions for the radius of curvature R include a total of five points circled in FIG. 5. At each measurement position, four radii of curvature formed at one crossing portion 225 are measured. In other words, the radius of curvature is measured at a total of 20 points, and the average of measurement values is determined to be the radius of curvature R at the crossing portion 225 of the partition wall 22.

The hydraulic diameter generally refers to the inner diameter of a pipe through which a liquid flows. When a flow path cross section is not a circle as in the cell 21 of a quadrangular cross-sectional shape in the exhaust gas purification filter 1, the hydraulic diameter d is calculated from the equation d=4A/L using the cross-sectional area A of each cell 21 and the cross-sectional length L of each cell 21. Thus, the radius r of the hydraulic diameter d is calculated from the equation r=d/2. Note that in a case where the cell 21 has a quadrangular cross-sectional shape, the cross-sectional length L is the sum of sides of the quadrangle and that the length of each side is measured with rounded vertexes in the cross-sectional shape of each cell 21 assumed as right-angled vertexes that are not rounded. The measurement positions conform to the measurement positions for the radius of curvature R as described above. The hydraulic diameter is measured at the five points corresponding to the measurement positions, and the average of measurement values is determined to be the hydraulic diameter d of each cell 21.

In the exhaust gas purification filter 1, R [mm]/r [mm], corresponding to the ratio between the radius of curvature R at each crossing portion 225 of the partition wall 22 and the radius r of the hydraulic diameter d of each cell 21, is larger than 0.2 and less than 1. In other words, the exhaust gas purification filter 1 satisfies the relationship 0.2<R [mm]/r [mm]<1.

In the exhaust gas purification filter 1, the porosity P1 of the partition wall 22, the porosity P2 of the skin member 12, the porosity difference ΔP, and the R [mm]/r [mm] defined as described above are assumed to be in the particular ranges described above. This allows the exhaust gas purification filter 1 to improve thermal shock resistance while maintaining a reduced pressure loss. The reason why such effects are produced will be explained below.

The exhaust gas purification filter 1 (GPF) collecting PM discharged from the gasoline engine is exposed to a high temperature environment as compared with a DPF, therefore a flow velocity of exhaust gas is high and the pressure loss tends to increase. Thus, the porosity P1 of the partition wall 22 needs to be increased. In the exhaust gas purification filter 1, the partition wall 22 has a high porosity, that is, porosity P1 of the partition wall 22 is 50% or more, and thus a decrease in gas permeability coefficient of the partition wall 22 is suppressed, allowing a reduced pressure loss to be maintained. On the other hand, the porosity P1 of the partition wall 22 and the porosity P2 of the skin member 12 are both 70% or less, and thus a filter strength required at the time of canning can be ensured. Here, in the exhaust gas purification filter 1, the relationship P1<P2 is satisfied, and the porosity difference ΔP, defined by P2−P1, is 20% or less. When pore properties are in a relationship as described above, the Young's modulus E1 of the cell assembly 2 and the Young's modulus E2 of the skin member 12 satisfy the relationship E1>E2. Thermal stress σ is expressed by the equation σ=E (Young's modulus)×α (thermal expansion coefficient)×ΔT (temperature difference). Young's modulus is a property determined by the cohesion between atoms, and thus the Young's modulus decreases with increasing porosity. Consequently, the relationship Young's modulus E=σ (stress)/ε (distortion), the smaller Young's modulus, the easier it is to distort, and the material becomes more flexible against stress. Thus, in the exhaust gas purification filter 1, the skin member 12 acts like a cushion to absorb stress occurring when thermal expansion from the central portion of the filter, which has high temperature during use, to the skin member 12. In other words, a small Young's modulus produces the effect of allowing the skin member 12, located at the outermost circumference, to take thermal shock. As a result, the exhaust gas purification filter 1 alleviates thermal stress to improve thermal shock resistance. Furthermore, in the exhaust gas purification filter 1, compared to the right-angled shape of the crossing portions 225, the arc shape of the crossing portions 225 enables an increase in cross-sectional area of the partition wall 22 at the crossing portions 225. Thus, the partition wall 22 are reinforced at the crossing portions 225, increasing the filter strength. This particularly increases the strength against the stress in the direction orthogonal to the filter axial direction Y. In this case, in the exhaust gas purification filter 1, the R [mm]/r [mm] being smaller than 1 leads to the partition wall 22 at the crossing portions 225 being thickened outside the circle with the hydraulic diameter d. Thus, even though the outer periphery 213 of each cell 21 is rounded at the crossing portions 225 of the partition wall 22 (the corners of the cell 21 are shaped like arcs), the flow of exhaust gas is prevented from being restricted, allowing a possible increase in pressure loss to be suppressed. Furthermore, thickening the partition wall 22 at the crossing portions 225 enables an increase in heat capacity (≅weight). In other words, in the exhaust gas purification filter 1, the R [mm]/r [mm] being smaller than 1 increases the heat capacity while minimizing the adverse effect on the pressure loss, correspondingly allowing the thermal heat resistance to be improved. In this case, the R [mm]/r [mm] being larger than 0.2 allowing a possible significant increase in thermal stress to be suppressed. As described above, the exhaust gas purification filter 1 allows the thermal shock resistance to be improved while maintaining a reduced pressure loss due to the high porosity.

In the exhaust gas purification filter 1, in a case where the partition wall 22 has a porosity P1 of less than 50%, the gas permeability coefficient of the partition wall 22 is reduced to increase the pressure loss, leading to difficulty in maintaining a reduced pressure loss. In view of the ease with which a reduced pressure loss is maintained, and the like, the porosity P1 of the partition wall 22 can be preferably 55% or more, more preferably 57% or more, and much more preferably 60% or more. On the other hand, the porosity P1 of the partition wall 22 exceeding 70% reduces the filter strength and prevents maintenance of the filter strength required during canning. In view of an increased filter strength and the like, the porosity P1 of the partition wall 22 can be preferably 68% or less, more preferably 67% or less, even more preferably 66% or less, and still much more preferably 65% or less. Additionally, the porosity P2 of the skin member 12 being less than 50% leads to difficulty in allowing the skin member 12 to absorb thermal expansion of the partition wall 22, located inside the skin member 12, hindering improvement of thermal shock resistance based on alleviation of stress. In view of the ease with which thermal shock resistance is improved, the ease with which a difference between the porosity P1 of the partition wall 22 and the porosity P2 of the skin member 12 is secured, and the like, the porosity P2 of the skin member 12 can be preferably 55% or more, more preferably 57% or more, and much more preferably 60% or more. On the other hand, the porosity P2 of the skin member 12 exceeding 70% reduces the filter strength and prevents maintenance of the filter strength required during canning. In view of an increased filter strength and the like, the porosity P2 of the skin member 12 can be preferably 68% or less, more preferably 67% or less, even more preferably 66% or less, and still much more preferably 65% or less.

In the exhaust gas purification filter 1, a porosity difference ΔP exceeding 20% leads to difficulty in setting the porosity P1 of the partition wall 22 and the porosity P2 of the skin member 12 within the particular ranges described above, reducing selection ranges of both porosities. Additionally, the porosity difference ΔP exceeding 20% leads to difficulty in manufacturing based on integral molding of the cell assembly 2 and the skin member 12, increasing a need to add a separate step. This degrades filter manufacturability. The porosity difference ΔP being 0 provides both the partition wall 22 and the skin member 12 with uniform material properties. Thus, the filter cell central portion, which is likely to have high temperature due to a flow of exhaust gas, is thermally expanded, and when stress reaches the skin member 12, which has uniform porosity (uniform Young's modulus) with the partition wall 22, the distortion fails to be resisted, leading to cracking in the skin member 12. In view of a difference in molding pressure between the skin member 12 and the cell assembly 2 during molding which difference allows the porosity difference ΔP to be reliably secured, and the like, the porosity difference ΔP can be preferably 1% or more, more preferably 3% or more, and much more preferably 5% or more. Additionally, in view of manufacturing ease, the particle size distribution of the raw material, and the like, the difference ΔP can be preferably 15% or less, more preferably 12% or less, and much more preferably 10% or more.

In the exhaust gas purification filter 1, when the R [mm]/r [mm], corresponding to the ratio between the radius of curvature R at each crossing portion 225 of the partition wall 22, and the radius r of the hydraulic diameter d of each cell 21, exceeds 1, the partition wall 22 at the crossing portions 225 are reinforced by being thickened to reach the inside of the circle with the hydraulic diameter d. This increases the pressure loss to prevent a reduced pressure loss from being maintained. The R [mm]/r [mm] being less than 0.2 reduces an area of a traverse cross section of a cell assembly in a plane orthogonal to the filter axial direction Y, reducing the heat capacity of the exhaust gas purification filter 1. As a result, the thermal stress is likely to increase significantly, preventing the thermal shock resistance from being improved. In view of the ease with which a reduced pressure loss is maintained, and the like, the R [mm]/r [mm] can be preferably 0.9 or less, more preferably 0.8 or less, and much more preferably 0.7 or less. Additionally, in view of reliable improvement of the thermal heat resistance and the like, the R [mm]/r [mm] can be preferably 0.25 or more, more preferably 0.3 or more, and much more preferably 0.35 or more.

In the exhaust gas purification filter 1, the skin member 12 can generally have a larger thickness than the partition wall 22. The skin member 12 is, for example, at least twice and at most four times as thick as the partition wall 22. Specifically, the partition wall 22 can have a thickness of 150 μm or more and 240 μm or less. The thickness of the partition wall 22 is measured as follows. A took maker's microscope is used to measure the thickness of the partition wall 22 at five points in the filter end surface, and the average of measurement values is determined to be the thickness of the partition wall 22. Note that the measurement positions at the five points described above are the same as the measurement positions for the radius of curvature R described above.

Specifically, the skin member 12 can have a thickness of 0.3 mm or more and 1.0 mm or less. The thickness of the skin member 12 is measured as follows. The took maker's microscope is used to measure the thickness of the skin member 12 at eight points in the filter end surface, and the average of measurement values is determined to be the thickness of the skin member 12. Note that the measurement positions at the eight points described above include four intersecting points of the skin member 12 with lines drawn along a grid direction from the central portion O in the direction orthogonal to the filter axial direction Y toward the skin member 12 and four intersecting points of the skin member 12 with lines drawn along a direction inclined at 45° to the grid direction, from the central portion O toward the skin member 12.

Figure 6:
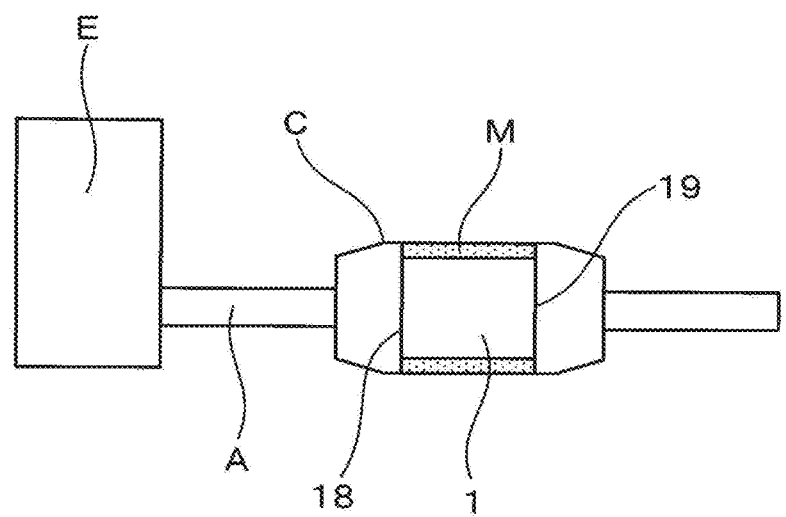
FIG. 6 is a schematic diagram of the exhaust gas purification filter disposed in an exhaust passage in the first embodiment.

The exhaust gas purification filter 1 is disposed in an exhaust passage A of a gasoline engine E for use as illustrated in FIG. 6. Specifically, for example, the exhaust passage A is coupled to a filter case C housing the exhaust gas purification filter 1 inside. The exhaust gas purification filter 1 is housed in the filter case C for use with a ceramic mat M wound around the outer circumference of the skin member 12. For prevention of misalignment during use, the exhaust gas purification filter 1 in the filter case C is subjected to an external pressure acting inward in the direction orthogonal to the filter axial direction Y.

The exhaust gas purification filter 1 can be manufactured, for example, as follows. First, a clay containing a cordierite forming raw material is produced. The clay is produced by adjusting silica, talc, aluminum hydroxide, and the like to prepare a cordierite composition, and adding and mixing a binder such as methyl cellulose, a pore making material such as graphite, a lubricating oil, water, and the like, to and with the composition. For preparation of the cordierite composition, alumina or kaolin may be compounded. As the silica, porous silica can be used. In the cordierite forming raw material, silica and talc may serve as pore forming raw materials. The pore forming raw material is a material for forming pores. The pore forming raw material generates a liquid phase component during firing, thus forming pores. On the other hand, in the cordierite forming raw material, aluminum hydroxide, alumina, and kaolin may serve as aggregate materials. The aggregate material is a material forming ceramic portions other than the pores.

Then, a mold is used to extrude the clay, and a resultant honeycomb compact is dried and fired. Thus, a honeycomb structure is formed that includes the skin member 12 and the cell assembly 2 that are integrally formed. The honeycomb structure includes the skin member 12, the partition wall 22, and the cells 21. The seal members 11 are formed after or before firing of the honeycomb structure. Specifically, for example, slurry for forming of the seal members 11 is used to alternately seal the end surfaces of the cells 21 in the honeycomb compact after or before firing, and then by firing to thereby form the seal members 11.

The porosity P1 of the partition wall 22 and the porosity P2 of the skin member 12 can be adjusted, for example, based on the presence of the pore making material, compounding of the pore forming raw material, a particle size, and the like. The porosity difference ΔP can be adjusted, for example, a time for kneading of the clay, mold design, and the like. Specifically, the porosity difference can be created by shortening the time for kneading of the clay to form gaps between raw material particles. Shortening the time for kneading of the clay suppresses wetting of particle surfaces (in other words, this is equal to intentional formation of aggregates) to form gaps (=air portions) between particles in the clay. When such a clay is extruded, in partition wall formation portions corresponding to portions through which the clay is passed and in which the width of slits in the mold is adjusted to a relatively small value, the gaps in the clay are destroyed due to pressure applied to the clay. On the other hand, in a skin member formation portion in which the width of slits in the mold is adjusted to a relatively large value, gaps remain in the clay without being destroyed. Firing such an extruded compact makes the porosity P1 of the partition wall 22 larger than the porosity P2 of the skin member 12, thus creating a porosity difference ΔP. The R [mm]/r [mm] can be adjusted by mold design or the like.

Second Embodiment

An exhaust gas purification filter according to a second embodiment will be described using FIG. 7. Note that of the reference numerals used in the second embodiment and subsequent embodiments, the same reference numerals as those used in the preceding embodiments represent the same components and the like as those in the preceding embodiments unless otherwise noted.

Figure 7:
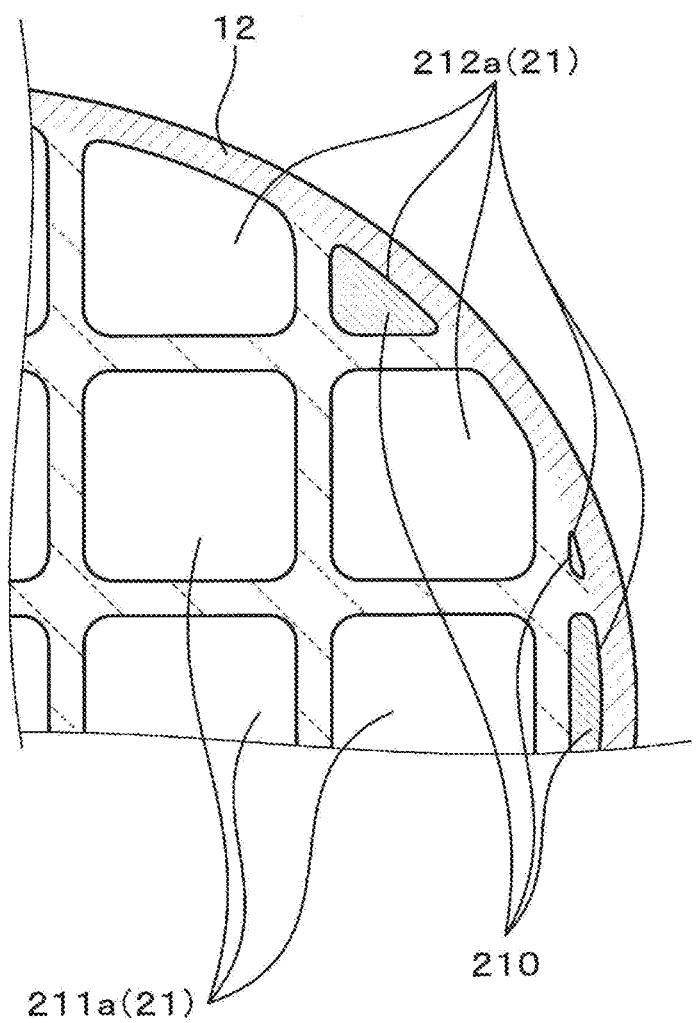
FIG. 7 is an enlarged cross-sectional view of an area around a skin member in the direction orthogonal to the filter axial direction of an exhaust gas purification filter in a second embodiment.

As illustrated in FIG. 7, in the exhaust gas purification filter 1 of the present embodiment, the cell assembly 2 includes a plurality of incomplete cells 212a located at the outermost circumference of the cell assembly 2. The cells 21 having a quadrangular cross-sectional shape in a plane orthogonal to the filter axial direction Y are assumed to be complete cells 211a. In contrast to the complete cells 211a, incomplete cells 212a are cells that are in contact with the skin member 12 and that have a cross-sectional shape different from a quadrangle in a plane orthogonal to the filter axial direction Y. In other words, the incomplete cell 212a is defined by the skin member 12 as well as by the partition wall 22 and thus does not have a complete quadrangular cross-sectional shape.

In the exhaust gas purification filter 1 of the present embodiment, of a plurality of incomplete cells 212a at the outermost circumference of the cell assembly 2, incomplete cells 212a having a cell opening area that is 30% or less of the cell opening area of the complete cell 211a are closed by closure members 210. The cell opening area of the complete cell 211a, used as a reference, is the average value of measurement values obtained by measuring the cell opening area of the complete cell 211a at five points in the filter end surface. Note that the measurement positions at the five points described above are the same as the measurement positions for the radius of curvature R described above.

The incomplete cells 212a each having a cell opening area that is 30% or less of the cell opening area of each of the complete cells 211a are small cells through which only a small amount of exhaust gas flows and which do not contribute to increasing the pressure loss. Consequently, by selectively closing such incomplete cells 212a, included in the plurality of incomplete cells 212a located at the outermost circumference of the cell assembly 2, the volume (weight) of the solid portion of the exhaust gas purification filter 1 is increased to enable a local increase in heat capacity without increasing the pressure loss. This enables the thermal heat resistance to be improved. Note that when the incomplete cells 212a are closed that have a cell opening area exceeding 30% of the cell opening area of each of the complete cells 211a, this is advantageous for improving the thermal heat resistance but increases the pressure loss. Thus, in a case where the incomplete cells 212a are closed, only the incomplete cells 212a are closed that each has a cell opening area that is 30% or less of the cell opening area of each of the complete cells 211a.

In the present example, the incomplete cells 212a that are to be closed and that extend in the filter axial direction Y are internally entirely closed by the closure members 210. In other words, the incomplete cells 212a that are to be closed and that extend in the filter axial direction Y are internally entirely filled with the closure members 210. This configuration increases the volume of the solid portion of the exhaust gas purification filter 1 to enable an efficient increase in heat capacity, thus allowing the thermal heat resistance to be more easily improved.

Note that the incomplete cell 212a that is to be closed and that extends in the filter axial direction Y may be partially closed by the closure members 210. Note that the closure members 210 can be easily formed by mold design during extrusion. Otherwise, the closure members 210 can also be formed in the same manner as the seal members 11 described above. The other components and effects are the same as those of the first embodiment.

Third Embodiment

An exhaust gas purification filter 1 according to a third embodiment will be described using FIGS. 8 to 10. In the exhaust gas purification filter 1 of the present embodiment, the material strength $S_A$ of the cell assembly 2 and the material strength $S_B$ of the skin member 12 satisfy the relationship $S_B<S_A$. This configuration increases the filter strength. Furthermore, when this configuration is exposed to high temperature, the cell assembly 2 has a higher temperature and is more significantly thermally expanded, within the filter base material. However, the increased material strength allows the thermal expansion to be resisted, hindering the thermal stress from reaching the skin member 12. Thus, possible cracking in the skin member 12 is more easily suppressed.

Figure 8A:
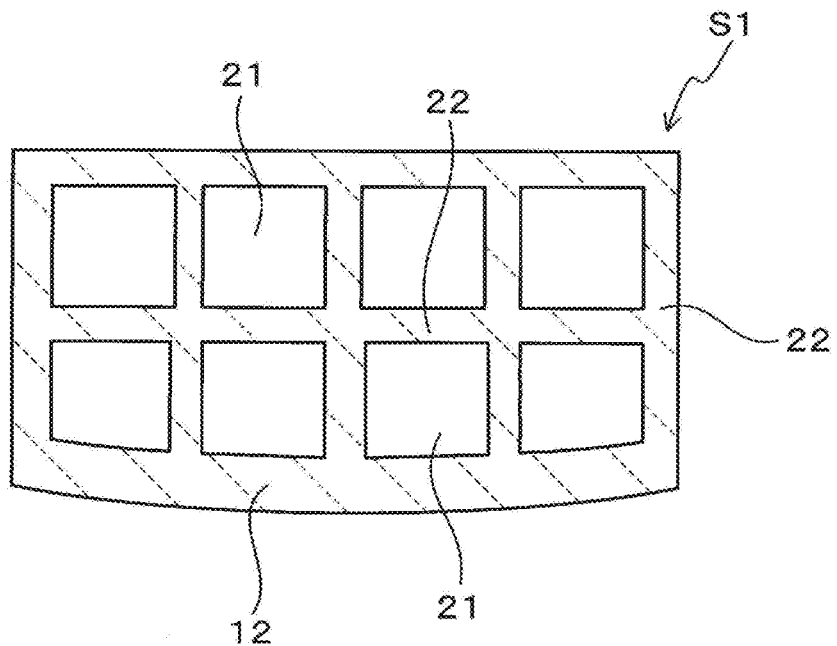
FIG. 8A is a schematic cross-sectional view of a measurement sample used to measure the material strength of the skin member in a third embodiment.
Figure 8B:
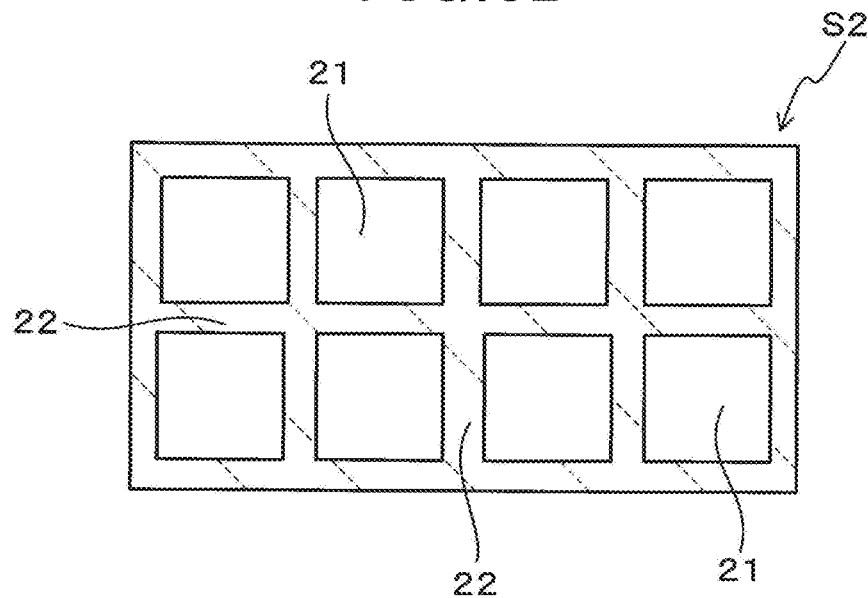
FIG. 8B is a schematic cross-sectional view of a measurement sample used to measure the material strength of a cell assembly in the third embodiment.

The material strength $S_A$ of the cell assembly 2 and the material strength $S_B$ of the skin member 12 are measured as follows. First, measurement samples S1 and S2 are collected from the exhaust gas purification filter 1 as illustrated in FIGS. 8A and 8B. Specifically, five measurement samples S2 are collected from the exhaust gas purification filter 1 within a range of 30 mm away in the radial direction from the central portion O in the direction orthogonal to the filter axial direction Y (specifically, the filter radial direction), and five measurement samples S1 are collected from the exhaust gas purification filter 1 within a range of 30 mm away in the radial direction from the outermost circumference in the direction orthogonal to the filter axial direction Y. As illustrated in FIG. 8A, the measurement sample S1 including the skin member 12 is collected from within the range of 30 mm away from the outermost circumference in the radial direction. The measurement samples S1 and S2 each include the cells 21 corresponding to four cells in the width direction and two cells in the thickness direction. The measurement samples S1 and S2 each have a length of 50 mm in the filter axial direction Y and are block bodies. Note that in FIG. 8A and FIG. 8B, rounding of the outer periphery 213 of each cell 21 at the crossing portions 225 of the partition wall 22 is omitted for convenience.

Figure 9:
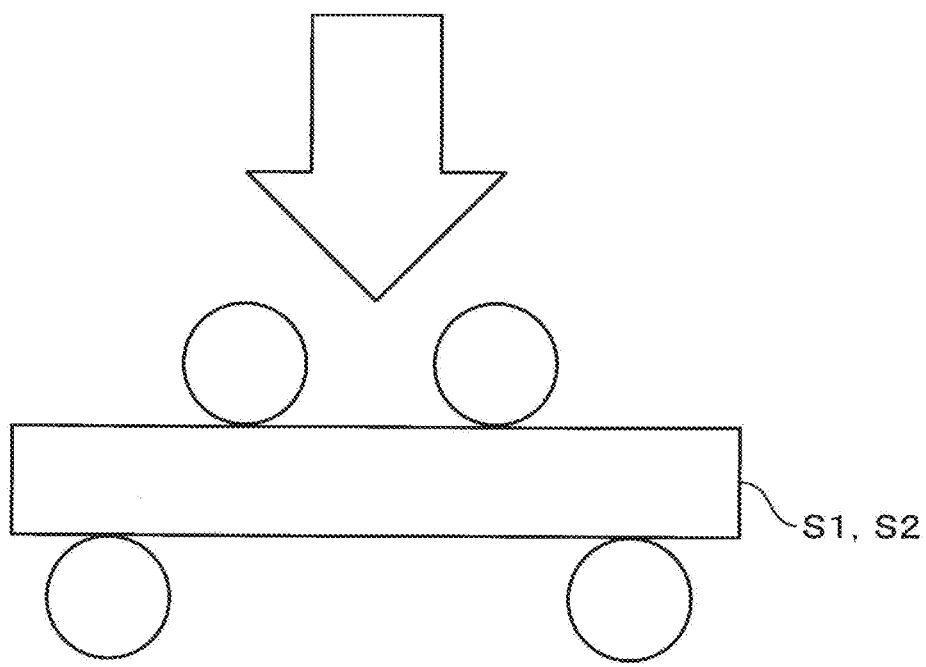
FIG. 9 is a schematic diagram illustrating a four-point bending test in the third embodiment.
Figure 10:
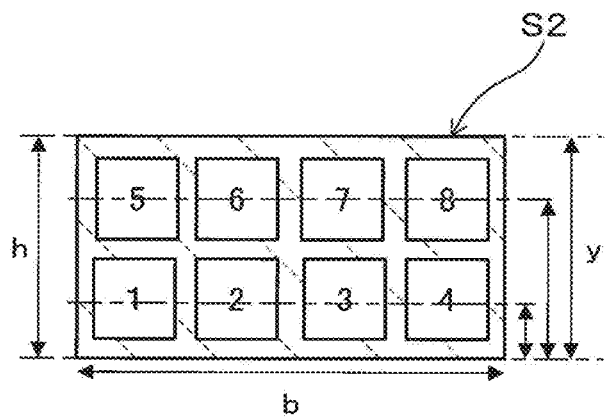
FIG. 10 is an explanatory diagram illustrating a relationship between the measurement sample for the material strength and a variable for a section modulus in the third embodiment.

As illustrated in FIG. 9, four-point bending tests are conducted on the measurement samples S1 and S2 in accordance with JIS R1601: 2008 "Testing method for flexural strength of fine ceramics at room temperature," and the material strength is obtained by dividing a bending moment (unit: N*m) obtained when the measurement sample is cracked, by a section modulus that takes the filter cross section into account. The material strength $S_A$ of the cell assembly 2 is the average value of the material strengths of the five measurement samples S2. The material strength $S_B$ of the skin member 12 is the average value of the material strengths of the five measurement samples S1. Note that in the four-point bending test for the measurement samples S1, the skin member 12 side is located on the lower side to apply, to the skin member 12, tensile stress attributed to bending.

The material strengths are expressed by equations below.

Material strength (MPa)=bending moment (N*mm)/ section modulus (mm³)

The bending moment is expressed by equation below.

Bending moment (N*mm)=load (N)×inter-fulcrum distance in four-point bending test (mm)/4

The section modulus is expressed by Equation V below. As illustrated in FIG. 10, in Equation V, the following are assumed: a: the cross-sectional area (mm²) of the measurement sample in a plane orthogonal to the filter axial direction Y, y: the distance (mm) from each reference axis to a member surface, b: the width (mm) of the measurement sample, h: the height (mm) of the measurement sample, and i: the second moment of area of each cell portion (mm⁴). Although FIG. 10 illustrates the measurement sample S2, the above description also applies to the measurement sample S1.

[Formula 1]

$$\text{Section modulus(mm}^3) = \frac{\text{Second moment of area (mm}^4)}{\text{Distance from reference axis to member surface (mm)}} \quad (V)$$

$$= \frac{\Sigma(ay^2 + i) - \Sigma aY^2}{Y}$$

$$= \frac{\Sigma(ay^2 + i) - \Sigma a(\Sigma ay/(a - \Sigma a))^2}{\Sigma ay/(a - \Sigma a)}$$

$$= \frac{\Sigma(ay^2 + i)}{\Sigma ay/(a - \Sigma a)} - \Sigma a \times \Sigma ay/(a - \Sigma a)$$

$$= \frac{\Sigma(ay^2 + bh^3/12)}{\Sigma ay/(a - \Sigma a)} - \Sigma a \times \Sigma ay/(a - \Sigma a)$$

The other components and effects are the same as those in the first embodiment. Additionally, the third embodiment is also applicable to the second embodiment.

The above-described exhaust gas purification filter will be more specifically described using experiment examples. Note that physical property values were measured in accordance with the above-described measurement methods.

Experiment Example 1

Figure 11:
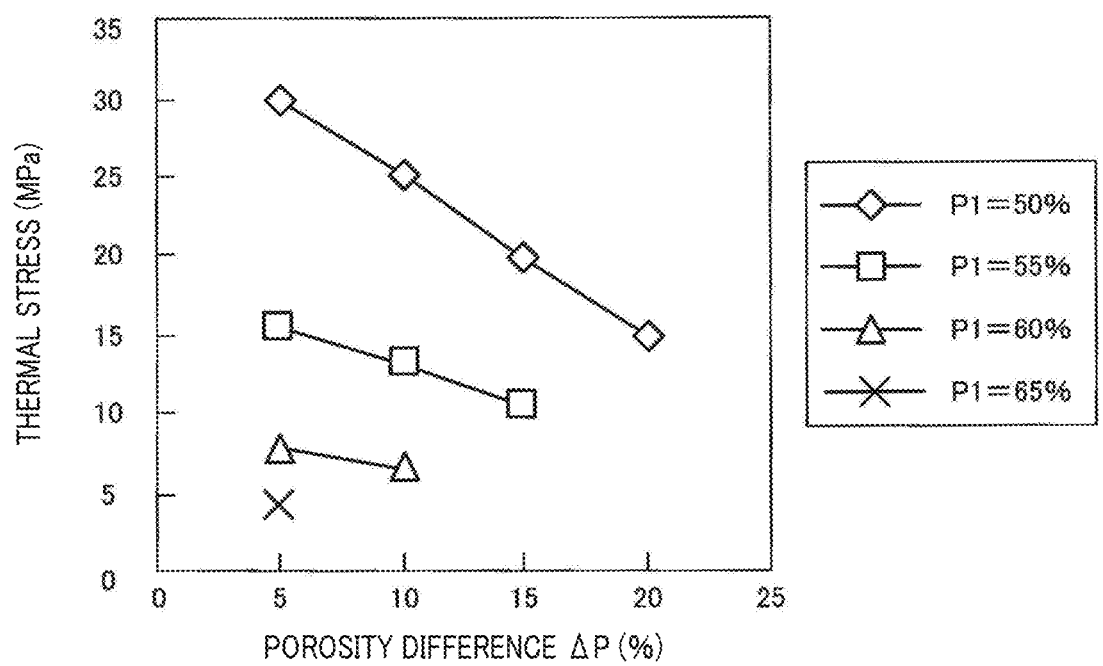
FIG. 11 is a diagram illustrating a relationship between a porosity difference ΔP and thermal stress σ in Experiment Example 1.

In the present experiment example, a plurality of exhaust gas purification filters having a porosity difference ΔP varying with the level of P1 within a range from 5% to 20% were produced by setting the porosity P1 of the partition wall to 50%, 55%, 60%, and 65% and varying the porosity P2 of the skin member. For the exhaust gas purification filters, the R [mm]/r [mm](hereinafter simply referred to as R/r) was set to a constant value larger than 0.2 and smaller than 1. In each of the exhaust gas purification filters, a length L in the filter axial direction Y is 100 mm, a diameter Φ is 118 mm, the partition wall has a thickness of 0.2 mm, the skin member has a thickness of 0.6 mm, and a cell pitch is 1.47 mm. For the exhaust gas purification filters, the thermal stress σ can be calculated by the equation E (Young's modulus)−α (thermal expansion coefficient)×ΔT (temperature difference). Note that ΔT (temperature difference) can be calculated by the equation ΔQ (amount of heat)/{M (weight)×Cp (specific heat)}. In the present example, specifically, the thermal stress σ was determined by CAE-analyzing the relationship between the porosity difference ΔP between the partition wall and the skin member, and the thermal stress. At this time, AnsysclassicV.17.2 was used as analysis software. FIG. 11 illustrates the relationship between the porosity difference ΔP (horizontal axis) and the thermal stress σ (vertical axis).

Studies by the inventors indicate that a porosity difference ΔP of 0 leads to uniform material properties in both the partition wall and the skin member and thus that when the filter central portion, which is likely to have a high temperature due to a flow of exhaust gas, is thermally expanded and the stress reaches the skin member, which has a uniform porosity (uniform Young's modulus) with the partition wall, the distortion fails to be resisted, causing cracking in the skin member. In contrast, as illustrated in FIG. 11, in a case where the porosity P1 of the partition wall is 50% or more and 70% or less, whatever porosity is taken by the partition wall, the thermal stress tends to decrease with increasing porosity difference ΔP. In other words, alleviating the thermal stress allows the thermal heat resistance to be improved.

Example 2

Figure 12:
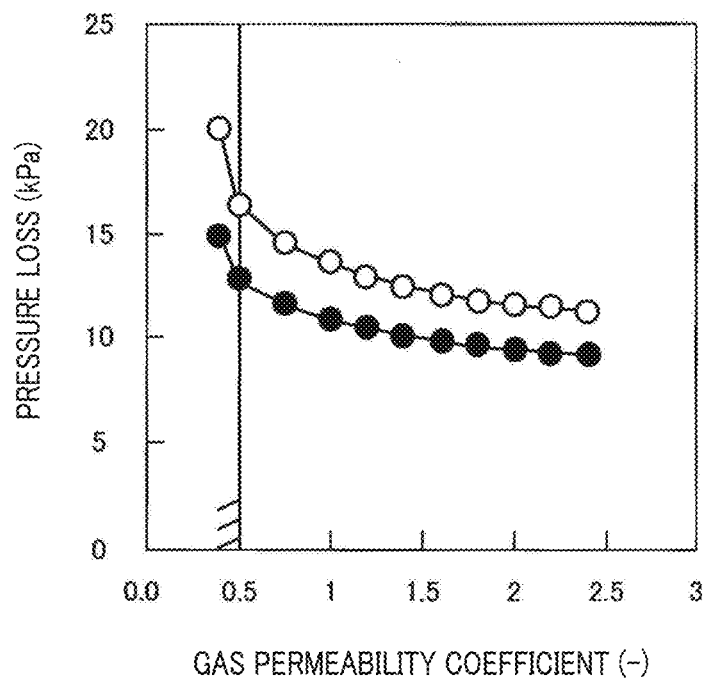
FIG. 12 is a diagram illustrating a relationship between a gas permeability coefficient and a pressure loss in Experiment Example 2.
Figure 13:
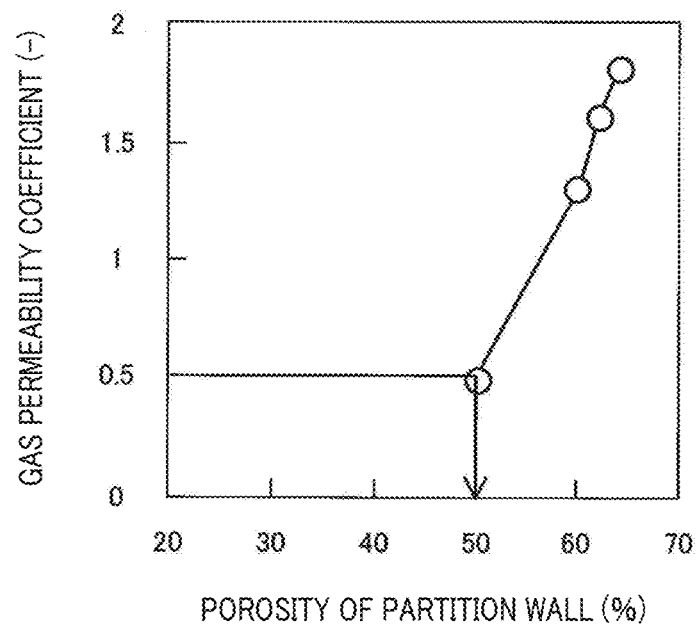
FIG. 13 is a diagram illustrating a relationship between the porosity of the partition wall and the gas permeability coefficient in Experiment Example 2.
Figure 14:
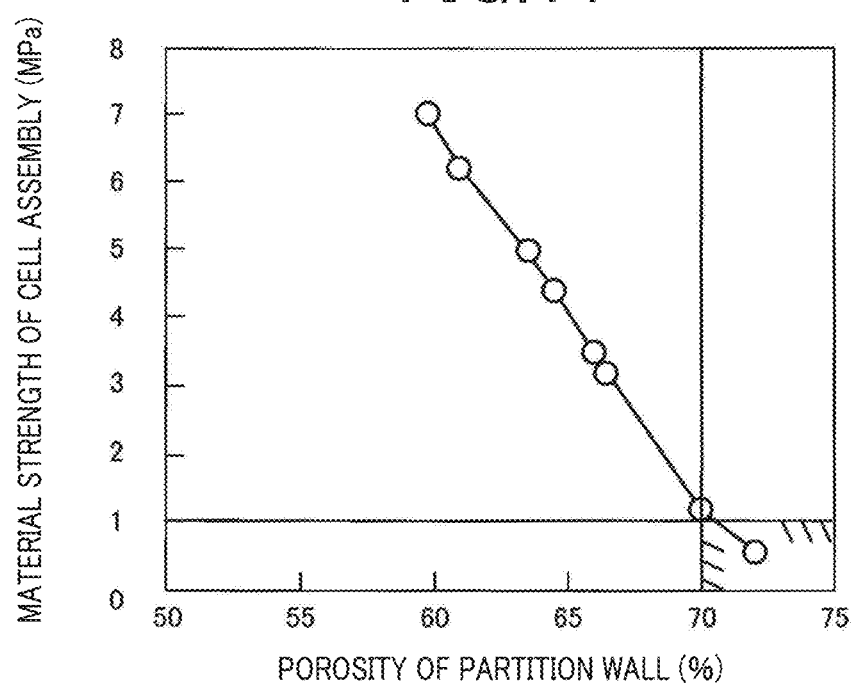
FIG. 14 is a diagram illustrating a relationship between the porosity of the partition wall and the material strength of the cell assembly in Experiment Example 2.

In the present example, a plurality of exhaust gas purification filters were produced such that the porosity P1 of the partition wall varied among the exhaust gas purification filters. In each exhaust gas purification filter, the porosity difference ΔP was set to 5%, and the R/r was set to a constant value larger than 0.2 and smaller than 1. In each of the exhaust gas purification filters, the length L in the filter axial direction Y is 100 mm, the diameter Φ is 118 mm, the partition wall has a thickness of 0.2 mm, the skin member has a thickness of 0.6 mm, and the cell pitch is 1.47 mm. For each of the exhaust gas purification filters, the gas permeability coefficient and the pressure loss were measured. Note that the gas permeability coefficient and the pressure loss were specifically measured based on well-known measurement methods disclosed in JP 2019-2298 A. Note that the well-known measurement methods disclosed in JP 2019-2298 A can be incorporated herein by reference. FIG. 12 illustrates the relationship between the gas permeability coefficient (horizontal axis) and the pressure loss (vertical axis). FIG. 13 illustrates the relationship between the porosity of the partition wall (horizontal axis) and the gas permeability coefficient (vertical axis). Additionally, for each of the exhaust gas purification filters, the material strength of the cell assembly was measured. FIG. 14 illustrates the relationship between the porosity of the partition wall (horizontal axis) and the material strength of the cell assembly (vertical axis).

As illustrated in FIG. 12, the pressure loss depends on the gas permeability coefficient, and a reduced pressure loss can be maintained when the gas permeability coefficient is 0.5 or more. As illustrated in FIG. 13, the gas permeability coefficient is in a proportional relationship with the porosity of the partition wall. The gas permeability coefficient is 0.5 when the partition wall has a porosity of 50%, and it is appreciated that the lower limit for the porosity of the partition wall is to be 50% in order to maintain a reduced pressure loss. Additionally, as illustrated in FIG. 14, the material strength of the cell assembly decreases with increasing porosity of the partition wall. The pressure applied when the exhaust gas purification filter is housed in the filter case is up to 1 MPa. The partition wall having a porosity of more than 70% leads to difficulty in achieving the filter strength required during canning. Thus, the partition wall has a porosity of 70% or less. Note that the above-described reason also applies to the skin member.

Example 3

Figure 15:
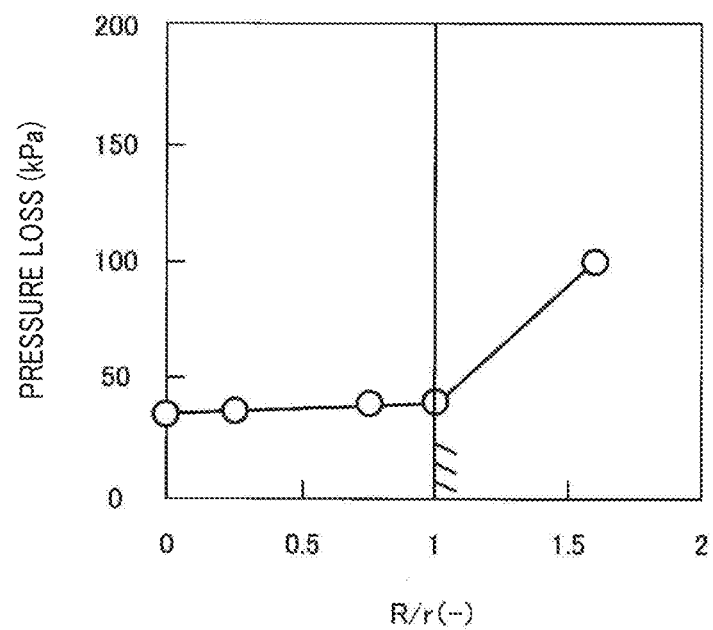
FIG. 15 is a diagram illustrating a relationship between the value of R/r and the pressure loss in Experiment Example 3.
Figure 16:
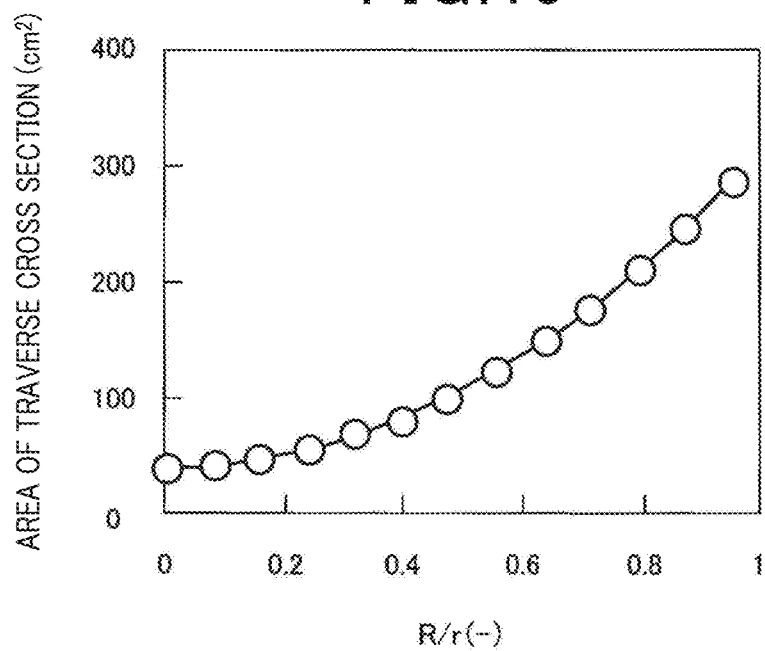
FIG. 16 is a diagram illustrating a relationship between the value of R/r and an area of a traverse cross section of a cell assembly in Experiment Example 3.
Figure 17:
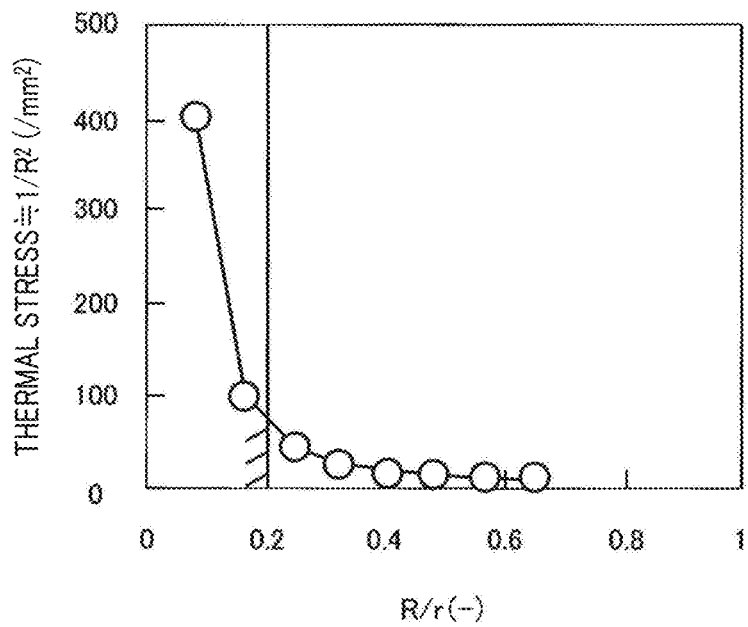
FIG. 17 is a diagram illustrating a relationship between the value of R/r and the value of $1/R^2$ in Experiment Example 3.

In the present example, a plurality of exhaust gas purification filters having different R/r values were produced. In each of the exhaust gas purification filters, the porosity of the partition wall and the porosity of the skin member both had a constant value of 50% or more and 70% or less, and the porosity difference ΔP was set to a constant value of more than 0% and 20% or less. In each of the exhaust gas purification filters, the length L in the filter axial direction Y is 100 mm, the diameter Φ is 118 mm, the partition wall has a thickness of 0.2 mm, the skin member has a thickness of 0.6 mm, and the cell pitch is 1.47 mm. For each of the exhaust gas purification filters, the pressure loss was measured. The pressure loss was measured as follows. The exhaust gas purification filter was mounted in an exhaust pipe of a 2.0-L gasoline direct-injection engine and set to a state (steady state) in which the amount of air sucked (Ga) was 100 g/s. Then, exhaust gas containing PM was caused to flow through the exhaust gas purification filter 1. At this time, the pressure was measured at positions preceding and succeeding the exhaust gas purification filter 1, and the difference between measurement values was determined to be a pressure loss. FIG. 15 illustrates a relationship between the value of R/r (horizontal axis) and the pressure loss (vertical axis). FIG. 16 illustrates a relationship between the value of R/r (horizontal axis) and the area of the traverse cross section of the cell assembly (vertical axis). FIG. 17 illustrates a relationship between the value of R/r (horizontal axis) and the value of $1/R^2$ (vertical axis).

As illustrated in FIG. 15, a value of R/r of 1 or more rapidly increases the pressure loss, whereas a value of R/r of less than 1 allows a reduced pressure loss to be maintained. This is because even in a case where the cell opening cross section through which exhaust gas flows is quadrangular, the exhaust gas flows within a circle referred to as a hydraulic diameter such that the circle serves as a boundary, and thus in an area outside the hydraulic diameter, the flow of the exhaust gas is not restricted even in a case where the thickness is increased at the crossing portions of the partition wall to round the outer periphery of the cell. This result indicates that the value of R/r needs to be less than 1 in order to maintain a reduced pressure loss.

On the other hand, as illustrated in FIG. 16, the area of the traverse cross section of the cell assembly and the heat capacity decrease as the value of R/r decreases below 1. As illustrated in FIG. 16, the area of the traverse cross section of the cell assembly is proportional to $(R/r)^2$, and thus the heat capacity is proportional to $(R/r)^2$. Here, in a case where ΔQ corresponding to an external factor of the exhaust gas purification filter is considered to be fixed in the equation σ (thermal stress)=E (Young's modulus)×α (thermal expansion coefficient)×ΔT (temperature difference) and the equation ΔT (temperature difference)=ΔQ (amount of heat)/{M (weight)×Cp (specific heat)}, the thermal stress is inversely proportional to the heat capacity. Consequently, the thermal stress and the value of R/r are in such a relationship as illustrated in FIG. 17. In other words, as the value of R/r decreases below 1, a boundary is generated beyond which the thermal stress is significantly increased. FIG. 17 indicates that when the value of R/r decreases below 0.2, the thermal stress increases. Based on this result, the value of R/r is set larger than 0.2 in order to suppress a possible significant increase in thermal stress to improve thermal heat resistance. Thus, by configuring the exhaust gas purification filter such that the relationship 0.2<R/r<1 is satisfied, the thermal heat resistance can be improved with a reduced pressure loss maintained.

Experiment Example 4

In the present experiment example, an exhaust gas purification filter was produced in which the porosity P1 of the partition wall and the porosity P2 of the skin member were both 50% or more and 70% or less, and satisfied the relationship P1<P2, the porosity difference ΔP was 20% or less, and the relationship 0.2<R/r<1 was satisfied. In each of the exhaust gas purification filters, the length L in the filter axial direction Y is 101.6 mm, the diameter Φ is 118.4 mm, the partition wall has a thickness of 0.216 mm, the skin member has a thickness of 0.6 mm, the cell pitch is 1.47 mm, and the cell corner has a radius of curvature R of 0.2 mm.

By closing the incomplete cells located at the outermost circumference of the cell assembly and not having a complete quadrangular shape, the heat capacity of the exhaust gas purification filter portion is increased. An increased heat capacity makes a temperature difference ΔT less likely to be caused based on the equation ΔT=ΔQ (amount of heat)/{M (weight)×Cp (specific heat)}, and improves the thermal heat resistance of the exhaust gas purification filter based on the equation σ (thermal stress)=E (Young's modulus)×α (thermal expansion coefficient)×ΔT (temperature difference).

In the present example, how many of the plurality of incomplete cells located at the outermost circumference of the cell assembly can be closed without affecting the pressure loss will be discussed in terms of an effective cell opening area. Note that the effective cell opening area is the opening area of cells (=effective cells) in an exhaust gas inflow end surface through which exhaust gas can flow when both filter end surfaces are alternately sealed to allow the exhaust gas to flow between the partition wall.

Figure 18:
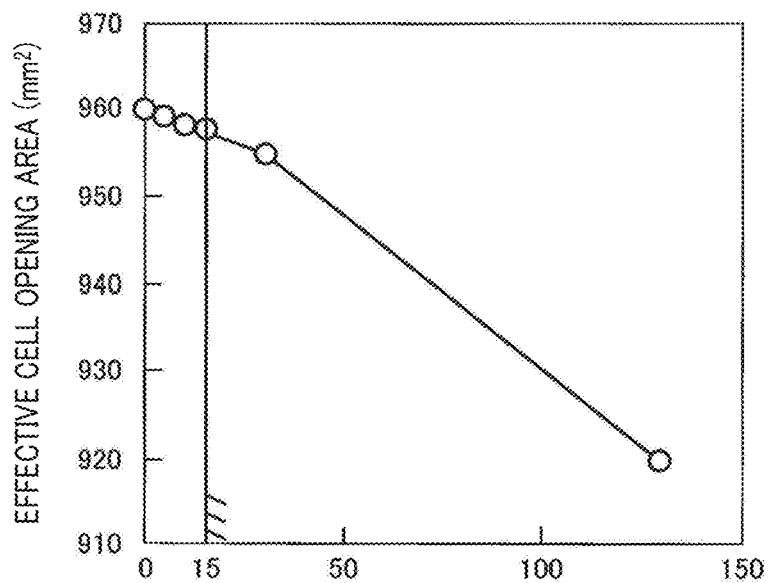
FIG. 18 is a diagram illustrating a relationship between the result of dividing the total area of closed incomplete cells by the area of one complete cell, and an effective cell opening area in Experiment Example 4.

The cell opening area a of a complete cell in the exhaust gas purification filter produced and the cell opening areas (a1, a2, a3, . . . in order of increasing area) of all the incomplete cells located at the outermost circumference of the cell assembly were measured. Then, the incomplete cells were sequentially closed in order of increasing cell opening area, and the effective cell opening area in the exhaust gas purification filter was determined. Specifically, with reference to the cell opening area a of one complete cell, incomplete cells having the same area as that of X cells each having the area a were sequentially closed in order of increasing area, and the resultant effective cell opening area was calculated. Note that a×X=a1+a2+a3 . . . is satisfied. FIG. 18 illustrates a relationship between the result of dividing the total cell opening area of closed incomplete cells by the cell opening area of one complete cell, and the effective cell opening area. The horizontal axis in FIG. 18 indicates how many complete cells have a total cell opening area corresponding to the cell opening area of incomplete cells closed in order of increasing cell opening area.

As illustrated in FIG. 18, when the total cell opening area of the incomplete cells closed is larger than the cell opening area of 15 complete cells, the effective cell opening area tends to decrease significantly. In other words, the closure of the incomplete cells increases the pressure loss. When the incomplete cells having the same area as that of 15 complete cells are sequentially closed in order of increasing cell opening area, in the present example, the maximum cell opening area of the incomplete cells is 0.4549 mm$^2$. Additionally, the cell opening area of the complete cells is 1.5382 mm$^2$ in the present example. Then, the maximum cell opening area of the incomplete cells resulting from sequential closure of 15 incomplete cells in order of increasing size is 29.6% (=100×0.4549/1.5382) of the cell opening area of the complete cells. Thus, the result indicates that by using the closure members to close those of the plurality of incomplete cells which have a cell opening area that is 30% or less of the cell opening area of the complete cells, the volume (weight) of the solid portion is increased to enable a local increase in heat capacity, allowing the thermal heat resistance to be further improved.

The present disclosure is not limited to the above-described embodiments or experiment examples, and various changes may be made to the embodiments and experiment examples without departing from the spirits of the present disclosure. Additionally, the configurations illustrated in the embodiments and experiment examples can be optionally combined together. In other words, the present disclosure has been described in compliance with the embodiments, but it is appreciated that the present disclosure is not limited to the embodiments, structures, or the like. The present disclosure includes various modified examples and variations within the range of equivalency. In addition, the category or conceptual range of the present disclosure includes various combinations or forms and other combinations or forms including only one of the elements or more than one of the elements or less than one of the elements.

What is claimed is:

1. An exhaust gas purification filter configured to be disposed in an exhaust passage of a gasoline engine, comprising:
    a cell assembly having an outer surface and including:
        a plurality of cells each disposed to extend in an axial direction of the filter, each of the cells having a quadrangular cross-sectional shape in a plane orthogonal to the axial direction, and each of the cells having opposing first and second ends in the axial direction, and
        a partition wall configured to have a porous structure and define the plurality of cells partitioned from each other;
    a plurality of seal members disposed alternately in the first and second ends of the respective cells, each of the seal members being configured to seal a corresponding one of the first end and the second end of a corresponding one of the cells of the cell assembly; and
    a skin member configured to have a tubular shape and be mounted on the outer surface of the cell assembly, wherein
    the partition wall has a porosity P1 of 50% to 70%, and the skin member has a porosity P2 of 50% to 70%,
    the porosity P1 of the partition wall and the porosity P2 of the skin member satisfy a relationship P1<P2,
    a porosity difference ΔP between the porosity P2 of the skin member and the porosity P1 of the partition wall is 20% or less, and
    the partition wall includes a plurality of crossing portions,
    each of the cells has at least one part of an outer periphery defined by a corresponding one of the crossing portions,
    the at least one part of the outer periphery of each of the cells is rounded to have a radius of curvature R,
    each of the cells has a radius r of a hydraulic diameter,
    the radius of curvature R and the radius r of the hydraulic diameter satisfy a relationship 0.2<R [mm]/r [mm]<1.

2. The exhaust gas purification filter according to claim 1, wherein
    the cell assembly comprises a plurality of incomplete cells which are located at an outermost circumference of the cell assembly and in contact with the skin member, each of the incomplete cells having a cross-sectional shape that is not a quadrangle in a plane orthogonal to the axial direction, and
    in response to the cells having a quadrangular cross-sectional shape serving as complete cells,
    part of the incomplete cells are closed by closure members, the part of the incomplete cells closed by the closure members having a cell opening area that is 30% or less of a cell opening area of the complete cells.

3. The exhaust gas purification filter according to claim 1, wherein the skin member is formed integrally on the outer surface of the cell assembly.

4. The exhaust gas purification filter according to claim 1, wherein the skin member is integrally and directly connected to the partition wall.

5. The exhaust gas purification filter according to claim 1, wherein the porosity difference ΔP between the porosity P2 of the skin member and the porosity P1 of the partition wall is 20% or less and 5% or more.

6. The exhaust gas purification filter according to claim 1, wherein the skin member is at least twice and at most four times as thick as the partition wall.

* * * * *